United States Patent [19]

Pollock

[11] 4,071,744
[45] Jan. 31, 1978

[54] LOOP INTEGRATION CONTROL SYSTEM

[76] Inventor: Eugene J. Pollock, 3000 San Pasquale, Albuquerque, N. Mex. 87110

[21] Appl. No.: 685,840

[22] Filed: May 13, 1976

[51] Int. Cl.² ............................................. G05B 13/02
[52] U.S. Cl. .................................. 364/105; 364/121; 364/570; 235/411
[58] Field of Search .............. 235/151.3, 150.1, 61.5 S

[56] References Cited

U.S. PATENT DOCUMENTS

| | | | |
|---|---|---|---|
| 2,805,022 | 9/1957 | Shelley | 235/61.5 S |
| 2,959,347 | 11/1960 | Kearns | 235/151.3 |
| 3,020,538 | 2/1962 | Teiling et al. | 235/61.5 S |
| 3,829,659 | 8/1974 | Margolis | 235/61.5 S |

Primary Examiner—Eugene G. Botz
Attorney, Agent, or Firm—Joseph E. Rusz; Jacob N. Erlich

[57] ABSTRACT

An In-Loop Integration Control System which is capable of producing consistent and accurate descriptions and predictions of any dynamic process, on line and in real time. This operation is performed by, first, integrating the best estimate of the highest derivative to produce an estimate of the expected next measurement and then comparing this measurement to the actual measurement; and second incorporating into the prediction any systematic error corrections. By changing the highest derivative on which the integration is performed, the total state vector describing the process is improved and all components are correctly timed.

14 Claims, 1 Drawing Figure

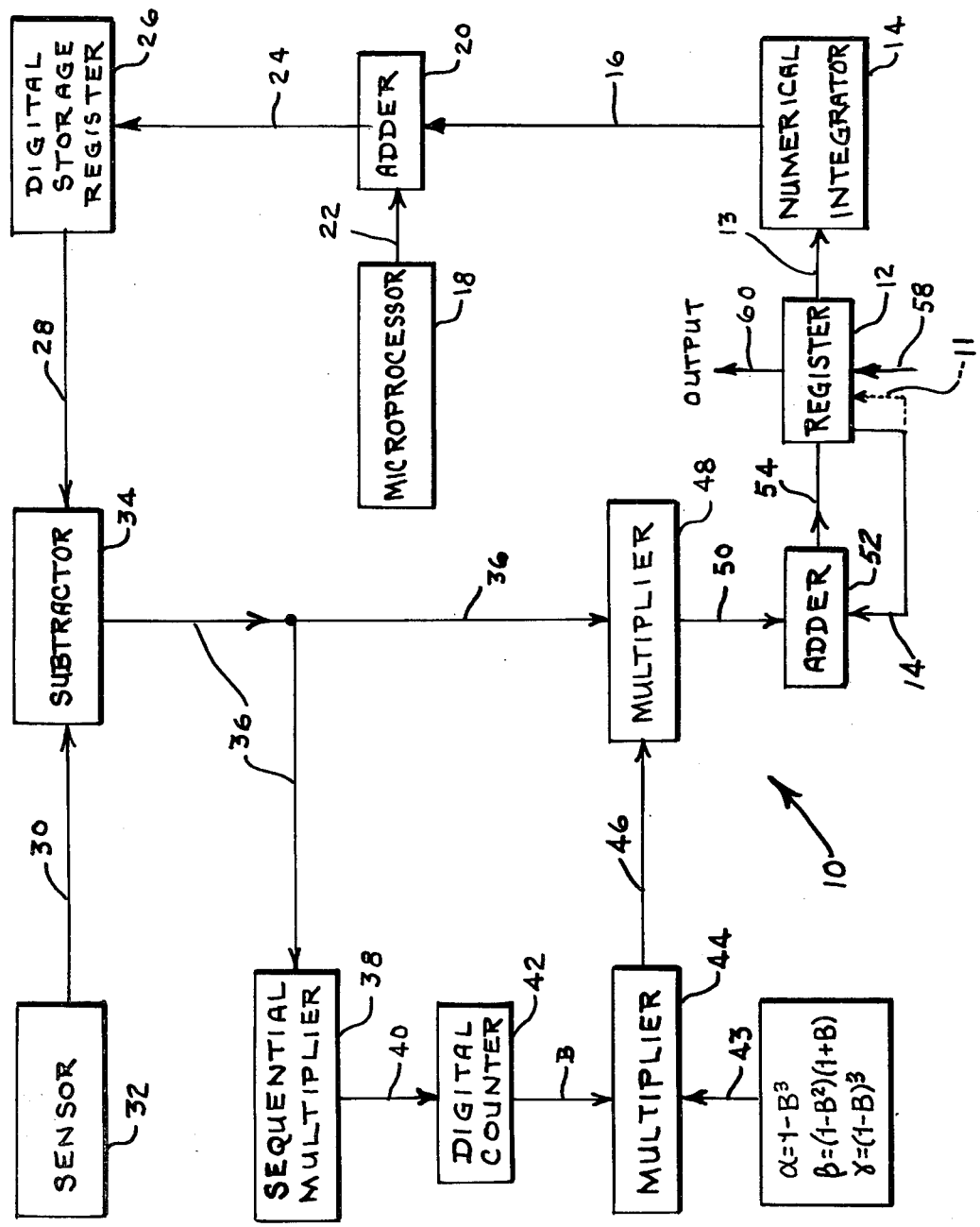

LOOP INTEGRATION CONTROL SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a system which measures components of position or frequency as a function of time, and, more particularly to an In-Loop Integration Control System which is capable of producing consistent and accurate descriptions and predictions of any dynamic process, on line and in real time.

In the field of radar tracking, particularly, a problem has arisen, which, because of modern technology, is being thrust into the foreground. This problem relates the tracking of objects with such quality as to permit mount support or remote direction of very long focal length telescopes with sufficient accuracy and smoothness to allow successful high resolution photography and related tasks requiring similar performance.

Although high accuracy instrumentation exists today, such precise instrumentation does not possess sufficient accuracy in areas outside of "post-flight" determinations. That is, the instrumentation now available requires accurate data on-line. Upon a more detailed analysis of the prior art techniques, it has further become apparent that the limiting factor of prior instrumentation is not so much the equipment utilized but the data processing procedure which incorporates conventional "derivative" tracking technology.

For a better understanding of the "derivative tracking" technique let us review the development of the state vector approach. Trajectory may be described at any given instance or epoch by a single multielement vector which is a combination composed of time, position, velocity and acceleration (TPVA). This vector is known as a state vector. A series of state vectors are necessary for a description of a changing trajectory. Time must be the independent variable in any trajectory determination process because if timing errors exist, all other efforts may be negated. Investigation of trajectory measurement systems has shown that timing associated errors have been the largest single contributor to poor accuracy. Regardless how the trajectory is determined, some method of determining time-position derivatives must be employed, since the ordinary sensor can only measure position or its components. It is the accuracy of the derivative data which ultimately describes the accuracy of the trajectory. To assure accuracy, it is necessary that the effects of errors in any of the four vectorial components be observable so that the error growth may be controlled.

The most effective and commonly used trajectory determining method of the past employed a differentiation process. In this procedure an estimate of the derivatives are obtained from time-position measurements by first differences (differentiation) as shown:

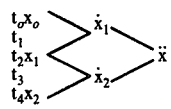

where t = time
x = position
$\dot{x}$ = velocity
$\ddot{x}$ = acceleration

Mathematically, instantaneous time-position derivatives can be obtained using the differentiation process and letting the time interval between samples approach zero. In practical measurements, however, discrete time measurement intervals occur, and the resulting time-position derivatives are averages which do not correspond exactly to any instantaneous value. As the overall time span is increased to derive the time-position derivatives, it becomes unlikely that the derivatives are correct for any particular time within the span. The derivatives obtained become averages over long periods, rather than representing actual values at any point along the trajectory. The situation is worse as measurements become noisier, since longer time intervals must be used and there is no guarantee that all noise (unwanted disturbances) will be filtered out. Another unfortunate aspect of the differentiation process is that all measured information (time and position) is used in computing time-position derivatives, so that no way of observing the result against other information is available. A decision can be made as to whether the time-position derivatives are "reasonable". There is no way results can be checked to determine whether noise was filtered out to leave good results, or whether noise remained and good data was filtered out to leave invalid results.

Perhaps another way to explain the problem is to point out that the conventional or derivative tracker is a device which seeks to keep a moving and perhaps maneuvering or accelerating target in the center of the field of view of the sensor (radar, telescope, etc.), by sensing errors, and transmitting these signals into the servo system in the mount to effect the corrections. The error signals are noisy. The process of following the target introduces lags into the data which are, in a practical sense, impossible to remove if the acceleration of the vehicle is unknown. The track is made rough because of the externally introduced unwanted disturbances (noise) which are amplified by the gain of the servo system. The center of the bore-sight is the reference for range, azimuth and elevation output data without regard to the position of the target in the field of view of the sensor or range gate.

An attempted solution to the problem was to filter the noisy boresight data prior to its introduction into the servo or, alternatively, to narrow the servo bandwidth. Either solution is undesirable because it results in an inability of the sensor to stay on track when the angular rates get high. Only a gross estimate of the state vector may be obtained using the time-position information sequence from the derivative or conventional system.

SUMMARY OF THE INVENTION

The In-Loop Integration Control system of this invention for determining, for example, a trajectory overcomes the problems as set forth in detail hereinabove by employing an integration process which permits a computer to point the sensors at a target in an extremely smooth and accurate manner.

In the instant invention a state vector composed of time, position, velocity and acceleration (TPVA), the current best estimate of the target trajectory, is determined by the derivative process set forth hereinabove. This determination is used to initialize the integration system of this invention. To update the state vector to the epoch of observation, the acceleration variable of the state vector is integrated once to produce a new velocity, and integrated again to give distance which, when added to the old position, gives a new position for the future time when the next position measurement is to be made. Instead of requiring a long span of data to get the filtered time-position information, the smooth pointing allows the measurements to be filtered over very short intervals. Assuming the second derivative (acceleration) is constant for $\Delta t$ (nominally $10^{-1}$ sec) then $$\dot{x}_i = \dot{x}_{i-1} + \Delta \ddot{x}_i \qquad \text{where } \dot{x}_i = \text{new position}$$

and $$x_i = x_{i-1} + \Delta t \dot{x}_i + \frac{(\Delta t)^2}{2} \ddot{x}_i \quad x_i = \text{new velocity}$$

The above equations are solved 10 times for each $\Delta t$, to provide a drive position update $100x$/second.

The sensor (position measure) data is then compared with the calculated position computed to the epoch of the position measurement. If the computed position is incorrect, the total state vector is adjusted until the position exactly fits the sensor measurement. With each new comparison and state vector modification, the accuracy of the state vector increases. Within the integration process, the major deficiencies associated with the differentiation process are overcome in that the state vector represents an exact description of the trajectory at discrete times, and the total state vector is checked by observing whether its integrated results correspond with the actual data from the sensor.

As with any tracking system, a correct "error model" is mandatory if a precise, accurate trajectory is to be produced. There are unwanted disturbances to the measurement and transformation process which, if allowed to contaminate the data, are errors which may seriously degrade the accuracy of the trajectory determination. These errors must be modelled (described) in an effort to remove them from the data. The equations which describe these errors are known as an error model. The term "transformation model" is used rather than error models since additions are introduced within instrument tracking loops (in-loop) and predrive to prevent these unwanted disturbances from causing perturbations which become errors.

In the derivative process there is no practical way in which the trajectory estimates can be verified except for reasonableness criteria. The individual errors are identified as a function of the statistics of an assumed error model. There are many possible error models. Errors are estimated by post-flight analysis of the track data utilizing statistical estimation procedures. Post-flight processing is done outside of the instrument tracking loops. These out-loop procedures introduce difficulties and uncertainties of interpretation and, in addition, they impose a limit on the accuracy of the bias determinations. The perplexing problems of interpretation encountered in attempting to assess instrumentation performance from estimates of error model coefficients are largely circumvented by using the In-Loop Integration Control (ILIC) system of this invention.

In-Loop Integration Control calculates the best estimate of a dynamic trajectory by integrating forward in time to obtain an estimate of position and then evaluating the correctness of the estimate (state vector) by direct position observation. If the estimate is incorrect, then the trajectory (state vector) is changed until it fits the measurement position data. In order to assure that the transformation (error model) data are correct, one uses a state vector which describes earth rate and star positions to point the instrument and boresight telescope. Since the relative star positions are well defined, one can correct the transformation model until it exactly fits the observation.

It should be noted that although the instant invention has great applicability in trajectory determination, it should be realized that this system is condusive to a very wide range of applications. For example, the instant invention has usage in any control environment which has as an input one or more noisy sensors.

It is therefore an object of this invention to provide an In-Loop Integration Control System capable of producing exceptionally smooth and stable tracking of targets, such as modulation of signature data where tracking noise is avoided.

It is another object of this invention to provide an In-Loop Integration Control System capable of producing trajectory data such that positioning is continuous even with missing measurement data.

It is still another object of this invention to provide an In-Loop Integration Control System which overcomes the high-low width dichotomy of the single servo channel of derivative trackers.

It is a further object of this invention to provide an In-Loop Integration Control System which allows extremely high operational servo band widths.

It is still a further object of this invention to provide an In-Loop Integration Control System which allows the observation of the effect of systematic error corrections thereby resulting in a high degree of operational accuracy.

It is a still further object of this invention to provide an In-Loop Integration Control System which is economical to produce and which utilizes conventional, currently available components in its manufacture.

For a better understanding of the present invention together with other and further objects thereof, reference is made to the following description taken in connection with the accompanying drawing and its scope will be pointed out in the appended claims.

DESCRIPTION OF THE DRAWING

The only FIGURE of the drawing is a schematic representation of the In-Loop Integration Control System of this invention.

DETAILED DESCRIPTION OF THE PREFERRED EMBODIMENT

Reference is now made to the only FIGURE of the drawing which sets forth in schematic fashion the In-Loop Integration Control System (ILIC) 10 of this invention. The basic concept of In-Loop Integration Control as set forth in this invention is to maximize the information in a noisy measurement process in order to produce a time history of the measurements and their derivatives. This is done in two basic but independent steps.

First, one integrates the best estimate of the highest time derivative to produce an estimate of the expected next measurement and then a comparison is made between the estimate and the actual measurement. When the difference between the prediction and the measurement is zero, then the vector is not adjusted. However, if the predicted and measured values are different, then the highest derivative is changed until the prediction or estimate and the measurement agree. By changing the highest derivative on which the integration is performed, the total state vector describing the process is improved and all components are correctly timed.

Second, all systematic error corrections are added to the prediction, in-loop to assure that the estimate reflects only the measurement uncertainty and *not* the effect of the systematic errors of the sensor/instrument associated therewith. The only FIGURE of the drawing is a generalized schematic of the In-Loop Integration Control technique.

In the In-Loop Integration Control System 10 there are at least three band widths of concern. The first is generally the highest band width and must be sufficient to adequately describe the dynamic process involved. This frequency translates to a high data rate. A second band width is the vector adjust band width. This translates to a data rate which is optimally much slower than the data rate of the process describing the dynamic process. The lower data is caused by a need *not* to disturb the smoothness of the dynamic process description by the introduction of the new vector. In many cases the vector adjust band width is lower by a ratio of 5:1. A third band width of interest is the adaptive weighing process which works at the same data rate as the vector adjust, but which is adaptively adjusted in band width depending on the dynamics against which the measurements are made. The band width may be varied from near zero when the vector is producing random measurement data up to half the band width of the vector adjust fixed band width when the data are random.

The In-Loop Integration Control System 10 utilizes a combination of conventional elements combined in a unique manner utilizing the process of integration rather than differential control, and, in addition, removing systematic errors in the control loop rather than data correcting after the measurement process has taken place.

The In-Loop Integration Control System 10 uses the current state vector 11 (which is the current best estimate of a target trajectory) composed of time, position, velocity and acceleration (TPVA) having been determined by the conventional derivative process as defined hereinabove for its initiation. This current state vector 11 is received by a conventional storage register 12. The acceleration portion 13 of the current state vector 11 is fed into a conventional numerical integrator 14. After performing its function of initiating the operation of the In-Loop Integration Control System 10 of this invention, the initial current state vector 11 is no longer a necessary input to system 10 and eventually will be replaced by a new current state vector in a manner to be described in detail hereinbelow.

The output 16 of numerical integrator 14 is an estimated future measurement and is generally computed by integrator 14 as a three component orthogonal set. Several numerical techniques for integration, such as the Runge Kutta, are available. Output 16 may be used as drive data to position or move an instrument on which sensors are mounted or as a direct estimate of the dynamic measurement prediction for those cases where direct comparison with a sensor measurement is possible and as explained hereinbelow.

Output 16 of numerical integrator 14 is now modified by adding those correction terms (systematic errors) which if omitted would appear as errors in the final output of system 10. The systematic error corrections are performed in a conventional multiprocessor or microprocessor 18. Microprocessor 18 is a device which computes the correction for many of the systematic or deterministic error model terms. Input to microprocessor 18 is an external calibration in the form of survey, level, refraction inputs, etc. These systematic errors must be accounted for in all instrumentation. In some instances the systematic errors may vary from very simple look up tables which would essentially be formed of conventional registers and adders to on-line calculations of a very detailed nature which, in the instant invention, would be performed in microprocessor 18.

A conventional adder 20 combines the systematic error correction output 22 of microprocessor 18 with the output 16 of numerical integrator 14. The application of this set of corrections 22 then changes the output 16 from numerical integrator 14 to a corrected estimate of the next actual measurement or "boresight" (sensor center) where the term corrected means within a predetermined degree of accuracy. The output 24 from adder 20 which contains the corrected individual sensor predictions will be received by any conventional digital storage register 26.

Sensor prediction output 28 from digital storage register 26 is, at a predetermined time, compared with the output 30 from a sensor 32 in a conventional subtractor 34. Sensor 32 may be in the form of any suitable thermometer or barometer or can be in the form of a complex microwave receiving system. Subtractor 34 calculates the difference between the output 30 and the predicted output 28, producing an error output 36 which is utilized in a manner to be set forth hereinbelow.

A randomness test is performed by a conventional/sequential multiplier 38 which multiplies two sequential outputs 36. If the product thereof is negative then the data received is considered random about a sensor center, while if the product is positive the data are assumed trended (non random about the sensor center). Output 40 of multiplier 38 is applied to a conventional digital counter 42 which is decremented when the sample is trended and incremented when random. This procedure generates a number B, an adaptive gain signal, which is considered an operator who's value is large when the tracking data are random and small when trended. The count-up rate is always the same while the count-down rate is dependent on the length of time that the data are tended.

A set of preselected external polynomial equations 43 are used to generate three adaptive gain weighing factors or adaptive gain multipliers ($\alpha$, $\beta$, $\gamma$) within a conventional multiplier 44 utilizing the number B obtained from digital counter 42. $\alpha$ is used to compute the basic measurement multiplier, $\beta$ to compute the first derivative or velocity multiplier while $\gamma$ may be used to compute the second derivative or acceleration multiplier. Typical examples are as follows:

$\alpha = 1 - B^3$;
$\beta = (1 - B^2)(1 + B)$; and
$\gamma = (1 - B)^3$.

The output 46 resulting therefrom is used to compute a correction for the current state vector 11, which initially is the same state vector determined from the above mentioned derivative process.

A conventional multiplier 48 combines the error output 36 (Ep) with the output 46, the position multiplier ($\alpha$), the velocity multiplier ($\beta$) and the acceleration multiplier ($\gamma$) to produce a correction term 50 to update the current state vector 11 (now considered the old state vector). These corrections 50 are combined with state vector 11 (now the old state vector) by using a conventional binary adder 52 thereby producing a new state vector 54. New state vector 54 is fied into storage register 12 into which is also fed an independent variable 58 such as time. The new state vector 54 along with the independent variable value 58 is stored in register 12 to produce the updated state vector 60.

Updated state vector 60 is then (1) rerouted into adder 52 at a predetermined time thereby replacing old state vector 11 and becoming the next current state vector; (2) recorded or utilized as an output outside the system; and (3) has its acceleration portion 13 proceed to numerical integrator 14 where it replaces the acceleration portion of previous vector 11. The numerical integrator output 16 proceeds through the In-Loop Integration Control System 10 in the manner set forth hereinabove.

The sensor data 30 is continually compared with the calculated or estimated data 28. With each new comparison, the state vector is modified, that is the acceleration portion of the state vector increases. When the difference 36 between the prediction or estimated measurement 28 and the sensor measurement 30 is zero, then the state vector is no longer adjusted. However, if the predicted and measured values 28 and 30, respectively, are different, then the highest derivative, acceleration, is changed until the prediction or estimate 28 and the actual measurement 30 agree. By changing the highest derivative on which the integration is performed, the total state vector describing the process is improved and all components are correctly timed.

Although this invention has been described with reference to a general embodiment it will be understood to those skilled in the art that this invention is also capable of a variety of specific embodiments within the spirit and scope of the appended claims.

I claim:

1. An In-Loop Integration Control System comprising means for receiving and storing a state vector measurement input, said state vector measurement being defined in terms of time, position, velocity and acceleration, means operatively connected to said receiving and storing means for receiving said acceleration term of said state vector measurement and for computing therefrom an estimate of a next actual measurement, means for providing systematic error terms for use within said system, means operatively connected between said systematic error term providing means and said computing means for combining the outputs therefrom thereby producing a corrected estimate of the next actual measurement, means operatively connected to said combining means for storing said corrected estimate of said next actual measurement, means for providing the next actual measurement, means operatively connected between said next actual measurement providing means and said storing means for comparing the outputs therefrom thereby producing sequential error measurements, means operatively connected to said comparing and error measurement producing means for comparing two of said sequential error measurements and producing an output therefrom, means operatively connected to said comparing means for generating an adaptive gain signal from said output, means operatively connected to said adaptive gain signal generating means for combining said adaptive gain signal with a plurality of polynomial equations thereby producing a plurality of adaptive gain multipliers, means operatively connected between said comparing and error measurement producing means and said combining and multiplier producing means for computing correction terms therefrom, means operatively connected between said correction term computing means and said input storing and receiving means for combining said correction terms with said input state vector measurement to produce an updated state vector measurement which replaces said input state vector measurement in said system and said system continually comparing said corrected estimate of said next actual measurement with said next actual measurement maintaining the difference therebetween at zero.

2. An In-Loop Integration Control System as defined in claim 1 wherein said means for computing an estimate of said next actual measurement is a numerical integrator.

3. An In-Loop Integration Control System as defined in claim 2 wherein said means for receiving and storing said state vector measurement is a register.

4. An In-Loop Integration Control System as defined in claim 3 wherein said means for combining said systematic error terms and said estimate of said next actual measurement is an adder.

5. An In-Loop Integration Control System as defined in claim 4 wherein said means for producing said next actual measurement is a sensor.

6. An In-Loop Integration Control System as defined in claim 5 wherein said means for comparing said next actual measurement and said corrected estimate of said next actual measurement is a subtractor.

7. An In-Loop Integration Control System as defined in claim 6 wherein said means for storing said corrected estimate of said next actual measurement is a register.

8. An In-Loop Integration Control System as defined in claim 7 wherein said means for comparing two of said sequential error measurements is a multiplier.

9. An In-Loop Integration Control System as defined in claim 8 wherein said means for generating an adaptive gain signal is a digital counter.

10. An In-Loop Integration Control System as defined in claim 9 wherein said means for combining said adaptive gain signal with said plurality of polynomial equations is a multiplier.

11. An In-Loop Integration Control System as defined in claim 10 wherein said means for computing said correction terms is a multiplier.

12. An In-Loop Integration Control System as defined in claim 11 wherein said means for combining said correction terms with said input state vector measurement is an adder.

13. An In-Loop Integration Control System as defined in claim 12 wherein said means for providing said systematic error terms is a microprocessor.

14. A method of producing consistent and accurate descriptions and predictions of a dynamic process comprising the steps of:
 1. receiving and storing a state vector measurement input, said measurement being defined in terms of time, position, velocity and accelerations;
 2. computing from said acceleration term of said input state vector measurement an estimate of a next actual measurement;
 3. combining systematic error terms with said estimate of a next actual measurement and producing a corrected estimate of the next actual measurement;
 4. comparing the corrected estimate of the next actual measurement with the next actual measurement in order to produce sequential error measurements;
 5. generating an adaptive gain signal from said sequential error measurements;

6. producing a plurality of adaptive gain multipliers from said adaptive gain signal;
7. computing correction terms from said sequential error measurements and said adaptive gain multipliers;
8. combining said correction terms with said input state vector measurement to produce an updated state vector measurement;
9. replacing said input state vector measurement with said updated state vector measurement; and
10. repeating said method until the comparison between said corrected estimate of said next actual measurement and said next actual measurement is zero.

* * * * *